United States Patent [19]

Ojakaar

[11] Patent Number: 5,554,680

[45] Date of Patent: Sep. 10, 1996

[54] HEAT-RESISTANT PERFLUOROELASTOMER COMPOSITION

[75] Inventor: Leo Ojakaar, Hockessin, Del.

[73] Assignee: E. I. Du Pont de Nemours and Company, Wilmington, Del.

[21] Appl. No.: 348,231

[22] Filed: Nov. 28, 1994

Related U.S. Application Data

[63] Continuation of Ser. No. 197,516, Feb. 16, 1994, abandoned.

[51] Int. Cl.$^6$ ..................................................... C08K 3/04
[52] U.S. Cl. ........................... 524/496; 524/544; 524/546
[58] Field of Search .................................... 524/496, 544, 524/546

[56] References Cited

U.S. PATENT DOCUMENTS

| | | | |
|---|---|---|---|
| 3,467,638 | 9/1969 | Pattison | 260/87.5 |
| 3,682,872 | 8/1972 | Brizzolara et al. | 260/80.76 |
| 4,035,565 | 7/1977 | Apotheker et al. | 526/249 |
| 4,281,092 | 7/1981 | Breazeale | 526/247 |
| 4,464,846 | 5/1987 | Enjo et al. | 524/496 |
| 4,972,038 | 11/1990 | Logothetis | 526/247 |
| 5,000,875 | 3/1991 | Kolouch | 524/496 |
| 5,110,858 | 5/1992 | Kim | 524/496 |
| 5,236,992 | 8/1993 | Bush | 524/495 |
| 5,256,747 | 10/1993 | Ojakaar et al. | 526/247 |
| 5,268,405 | 12/1993 | Ojakaar et al. | 524/247 |

FOREIGN PATENT DOCUMENTS

| | | |
|---|---|---|
| 4023657 | 1/1991 | Germany . |
| 3-122153 | 5/1991 | Japan . |

OTHER PUBLICATIONS

Tokai's Seast Carbon Black, Tokai Carbon Co., Ltd., pp. 5–6.

Asaki Carbon Black, Asahi Carbon Co., Ltd.

Encyclopedia Of Polymer Science And Engineering, vol. 2, (1985), p. 632.

Kirk–Othmer Encyclopedia Of Chemical Technology, 4th Ed., vol. 4, (1992), p. 1043.

M. Morton, Rubber Technology, 2nd Ed. (1973), p. 58.

*Primary Examiner*—Veronica P. Hoke

[57] ABSTRACT

Perfluoroelastomer compositions having high loadings of large-particle size carbon black exhibit superior performance at very high temperature.

12 Claims, No Drawings

HEAT-RESISTANT PERFLUOROELASTOMER COMPOSITION

This is a continuation of application Ser. No. 08/197,516 filed Feb. 16, 1994, now abandoned.

FIELD OF THE INVENTION

This invention relates to perfluoroelastomer compositions. In particular, this invention relates to perfluoroelastomer compositions having enhanced thermal stability.

BACKGROUND OF THE INVENTION

Perfluoroelastomers (elastomeric perfluoropolymers) exhibit outstanding high temperature tolerance and chemical resistance in both the cured and uncured states. These properties are attributable to the stability and inertness of the copolymerized perfluorinated monomer units which form the major portion of the polymer backbone, e.g. tetrafluoroethylene, perfluoro(methyl vinyl)ether, perfluoro(propyl vinyl)ether and others disclosed in U.S. Pat. Nos. 3,467,638; 3,682,872; 4,035,565; 4,281,092; and 4,972,038. Perfluoroelastomers also, however, necessarily contain small quantities of less stable copolymerized cure site monomers and, in addition, many perfluoroelastomers contain reactive endgroups introduced by the use of chain transfer agents or molecular weight regulators during polymerization. Such moieties must have a high degree of reactivity in order to promote effective crosslinking and cure chemistry, but this reactivity inherently renders the polymers more susceptible to degradative chemical reactions, such as oxidation. Consequently, certain physical properties of the polymer, in particular compression set, and high temperature stress/strain properties, are adversely affected. For example, the presence of copolymerized hydrogen-containing cure site monomers often results in decreased thermal stability. Other factors can also influence thermal stability of perfluoroelastomer compositions. As an example, the use of peroxide cure systems which incorporate hydrocarbon coagents, such as triallylisocyanurate, limits the upper service temperature of cured perfluoroelastomer compositions.

Thus, even the most stable of the previously-known perfluoroelastomer compositions suffer unacceptable degradation of properties in certain environments which are chemically and thermally demanding. For example, perfluoroelastomers containing pentafluorophenoxy or cyano-substituted perfluoro(vinyl ether) cure site monomers, which are among the most stable, cannot withstand long exposure to oxidative environments at temperatures exceeding 280° C. or contact with hydrocarbon fuel while under compressive stress at temperatures approaching 280° C.

It has now however been found that thermal stability of certain perfluoroelastomers can be substantially enhanced by compounding the polymers with specific amounts of large particle size, low surface area carbon blacks. By employing appropriate amounts of these fillers, perfluoroelastomer compositions have been prepared which are suitable for extended use at temperatures of 280° C. or more.

SUMMARY OF THE INVENTION

In particular, the present invention is directed to a composition comprising a) a perfluoroelastomer having no greater than 3 mole % copolymerized units of i) a cure site monomer which is free of hydrogen atoms or ii) a cure-site monomer having hydrogen atoms which are removed during crosslinking of the perfluoroelastomer; and b) 35–70 parts per hundred parts perfluoroelastomer of a carbon black having an average particle size of at least about 100 nm as determined by ASTM D-3849.

Among the most useful of such perfluoroelastomers are those compositions which comprise copolymerized units of a perfluoroolefin, a perfluoro(vinyl ether) and no greater than 3 mole % copolymerized units of i) a cure site monomer which is free of hydrogen atoms or ii) a cure-site monomer having hydrogen atoms which are removed during crosslinking of the perfluoroelastomer.

DETAILED DESCRIPTION OF THE INVENTION

The present invention is directed to perfluoroelastomer compositions having enhanced thermal stability. The compositions are composed of an exceptionally stable class of perfluoropolymers which are highly loaded with large particle size carbon black. Such compositions have been found to exhibit a compression set advantage and outstanding resistance to chemical degradation and mechanical fracture during exposure to hot jet aircraft fuel.

Perfluoroelastomers suitable for use in the compositions of this invention are elastomeric copolymers composed of copolymerized units of at least two principal perfluorinated monomers, the copolymers further containing copolymerized units of at least one cure site monomer. Generally, the first comonomer is a perfluoroolefin and the second comonomer is a perfluoro(vinyl ether) of the formula $CF_2=CFO(R_f'O)_n(R_f''O)_mR_f$ where $R_f'$ and $R_f''$ are different linear or branched perfluoroalkylene groups of 2–6 carbon atoms, m and n are independently 0–10, and $R_f$ is a perfluoroalkyl group of 1–6 carbon atoms. Representative perfluorinated olefins include tetrafluoroethylene, or others, such as hexafluoropropylene. A preferred class of perfluoro(vinyl ethers) are those of the formula $CF_2=CFO(CF_2CFXO)_nR_f$ wherein X is F or $CF_3$, n is 0–5, and $R_f$ is a perfluoroalkyl group of 1–6 carbon atoms. Most preferred perfluoro(vinyl ethers) are those wherein n is 0 or 1 and $R_f$ contains 1–3 carbon atoms. Examples of such perfluorinated ethers include perfluoro(methyl vinyl)ether and perfluoro(propyl vinyl)ether. Other monomers include compounds of the formulas shown below.

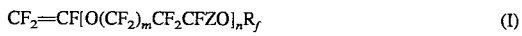

$$CF_2=CF[O(CF_2)_mCF_2CFZO]_nR_f \quad (I)$$

where $R_f$ is a perfluoroalkyl group having 1–6 carbon atoms, m=0 or 1, n=0–5, and Z=F or $CF_3$.

$$CF_2=CFO[(CF_2CFCF_3O)_n(CF_2CF_2CF_2O)_m(CF_2)_p]CF_3 \quad (II)$$

where m and n=0–10 and p=0–3.

Preferred copolymers are composed of tetrafluoroethylene and at least one perfluoro(alkyl vinyl)ether as principal monomer units. In such copolymers, the copolymerized perfluorinated ether units constitute from about 15–50 mol % of total monomer units in the polymer.

Small quantities of copolymerized cure site monomers are also present in the perfluoroelastomers of the invention, generally, in amounts no greater than about 3 mole %. The cure site monomers are preferably perfluorinated. In particular, the residue of the cure site monomer, after reaction with the cure system, should contain no hydrogen. Preferably, the cure site monomer is free of hydrogen atoms. Such cure site monomers include bromotrifluoroethylene, and monomers of the following formulas:

$$CF_2=CFO(CF_2CFCF_3O)_m(CF_2)_nBr \quad \text{(III)}$$

where n and m are independently 1,2, or 3.

$$CF_2=CFOCF_2CFBrCF_3 \quad \text{(IV)}$$

$$CF_2=CFOR_fCF_2Br \quad \text{(V)}$$

where $R_f$ is a perfluoroalkylene group containing 1–9 carbon atoms.

Cure site monomers which are particularly preferred are those that introduce side groups containing pentafluorophenyl or cyano substituents. Cure site monomers containing pentafluorophenyl groups are illustrated by the following formulas:

$$CF_2=CF-O(CF_2)_n-C_6F_5 \quad \text{(VI)}$$

wherein n=1–8

$$CF_2=CF-O(CF_2)_3-O-C_6F_5 \quad \text{(VII)}$$

and $$CF_2=CF-[OCF_2-CF_3CF]_n-O-C_6F_5 \quad \text{(VIII)}$$

wherein n=1–2

Examples of cyano-substituted cure site monomers include those shown in the following formulas:

$$CF_2=CF-O(CF_2)_n-CN \quad \text{(IX)}$$

wherein n=2–12, preferably 2–4, $$CF_2=CF-O-CF_2-[CFCF_3-O-CF_2]_n-CFCF_3-CN \quad \text{(X)}$$

wherein n=0–4, preferably 0–2, and $$CF_2=CF-[OCF_2-CF_3CF]_x-O-(CF_2)_n-CN \quad \text{(XI)}$$

wherein x=1–2, and n=1–4.

Cyano-substituted cure site monomers are a particularly preferred class because perfluoroelastomers containing these cure sites have superior processing characteristics and they are tightly crosslinked which results in low compression set. In addition, they are highly resistant to hot air oxidation. Those of formula (XI) are most preferred.

The perfluoroelastomers can be prepared by polymerization of the appropriate monomer mixtures with the aid of a free radical generating initiator either in bulk, in solution in an inert solvent, or in aqueous emulsion. Preparative details may be found in U.S. Pat. Nos. 4,281,092; 3,682,872; and 4,035,565;

In free radical polymerizations it is often desirable to produce polymers having end group chemistry, molecular weight, or molecular weight distribution different from those obtained under conditions wherein only initiator and monomers are present. The usual method of producing such compositions is through use of chain transfer agents or molecular weight regulators. The use of such compounds results in the introduction of end groups derived from the chain transfer agent which can chain extend the polymer or take part in polymer cure. Examples of chain transfer agents which can be employed to produce perfluoroelastomers useful in the compositions of the present invention include methylene iodide, monoiodoperfluoromethane, monoiodoperfluoropropane, perfluoroallyl bromide, 4-bromoperfluorobutene-1, and 1,4-diiodoperfluorobutane.

The particular carbon blacks useful in the compositions of this invention are those characterized by large average particle size. By large average particle size it is meant that the typical average particle size is at least about 100 nm up to about 500 nm, as determined by ASTM D-3849. Carbon blacks having average particle sizes in this range are graded at the upper end of Group No. 7 (average particle size 61–100 nm) and in Groups No. 8 (average particle size 101–200 nm) and 9 (average particle size 201–500 nm) of ASTM D-1765, the classification system for carbon blacks used in rubber products. Preferred carbon blacks have average particle sizes at the upper end of the range, generally from at least about 150 nm to about 500 nm. The most preferred carbon blacks have average particle sizes of at least about 200 nm. Examples of such carbon blacks are MT blacks (medium thermal black) designated N-991, N-990, N-908, and N-907, and large particle size furnace blacks. MT blacks are preferred.

It has been discovered that perfluoroelastomer compositions which are highly loaded with such large-particle carbon blacks exhibit unusual thermal resistance as indicated by compression set resistance and resistance to chemical degradation and mechanical fracture during exposure to jet aircraft fuel at temperatures of 288° C. Surprisingly, compression set values of such compositions fall within the useful range for many applications even after exposure for extended periods under these conditions. These performance characteristics render the compositions of this invention particularly suitable for o-rings used in hot areas of aircraft fuel systems.

A high loading of large particle size carbon black is necessary to obtain the enhanced thermal stability typical of the compositions of the present invention. That is, perfluoroelastomers which contain about 35–70 phr (parts per hundred parts rubber, by weight) have been found to provide a useful combination of thermal stability and processability. If less than 35 phr is used, high temperature stability is not appreciably enhanced, whereas if greater than 70 phr hardness is unacceptably high and elongation deteriorates. The range of carbon black concentration is preferably 35–60 phr, most preferably 40–60 phr because within this range there is an good balance of thermal stability and physical properties. Surprisingly, it has been found that within the 35–70 phr range compression set is essentially independent of carbon black loading which is a further advantage of the compositions of the present invention.

Carbon black fillers are used in elastomers as a means to balance modulus, tensile strength, elongation, hardness, abrasion resistance, and processibility of the compositions. In perfluoroelastomer compositions, small particle size, high-surface-area carbon blacks have been the fillers of choice. A grade commonly used is SAF carbon black, a highly reinforcing black with typical average particle size of about 14 nm and designated N110 in Group No. 1, according to ASTM D-1765. SAF carbon black is normally used in relatively low concentrations, e.g., 10–15 phr, both because it is effective at low concentrations and because hardness and compression set increase at high concentration. Compositions incorporating SAF carbon black are not suitable for service under the most demanding high temperature conditions because at loadings which provide the best thermal stability, the hardness of the compositions becomes too high and the compression set is unacceptable. MT blacks have been considered to be extenders rather than reinforcers and it is thus surprising that when these blacks are present in concentrations above 35 phr physical properties of the perfluoroelastomer compositions are enhanced.

The compositions of the present invention can be crosslinked by cure systems commonly used in conjunction with the particular copolymerized cure site monomer present, as known to those skilled in the art. For example, when a cure site containing a pentafluorophenyl group is present, a curing agent system based on an aliphatic diamine or, preferably, on the dipotassium salt of bisphenol AF, can be used. When a cure site containing cyano substituents is present, a cure system based on an organotin compound is usually chosen. Suitable organotin compounds include allyl-, propargyl-, triphenyl- and allenyltin curatives. Tetraphenyltin is a preferred curing agent for use in conjunction with cyano-substituted cure sites. The amount of curing agent used will necessarily depend on the degree of crosslinking desired in the final product as well as the type and concentration of reactive moieties in the perfluoroelastomer. In general, about 1–10 phr of curing agent can be used, and 2–5 phr are satisfactory for most purposes.

Other additives, such as stabilizers, plasticizers, lubricants, or processing aids typically used with perfluoroelastomers can be incorporated in the compositions of this invention provided they have adequate stability for the intended service conditions. In particular, low-temperature performance can be enhanced by incorporation of perfluoropolyethers while retaining superior high-temperature performance. The perfluoropolyethers which can be used in the compositions of this invention may be chosen from those in which oxygen atoms in the polymer backbone of the molecule are separated by saturated fluorocarbon groups. More than one type of fluorocarbon group may be present in the molecule.

The compositions of the present invention exhibit enhanced thermal stability in combination with low compression set. The compositions are suitable for use as o-rings, flange seals, pump diaphragms, gasket stock, and liners. However, they are particularly useful in applications wherein a high degree of heat resistance and chemical inertness is required, for example as o-rings which contact hot or corrosive liquids in aircraft engines or oil-drilling equipment.

The invention is further illustrated by the following examples, wherein all parts are by weight unless otherwise specified.

EXAMPLES

TEST METHODS

The following procedures were used to evaluate the compositions described in the examples:

| Stress/Strain Properties | ASTM D-412 |
|---|---|
| Modulus at 100% Elongation, $M_{100}$ | |
| Tensile Strength at Break, $T_B$ | |
| Elongation at Break, $E_B$ | |
| Compression Set, 70 hrs. @204° C. | ASTM D-395 |
| Hardness, Shore A | ASTM D-2240 |

Example 1

A perfluoroelastomer containing copolymerized units of tetrafluoroethylene, perfluoro(methyl vinyl)ether, and perfluoro-(8-cyano-5-methyl-3,6-dioxa-1-octene) in a mole ratio of approximately 69.3/30/0.7 was compounded on a rubber mill at 55° C. with the additives shown in Table I. The compounded compositions were molded into size 214 o-rings which were press-cured at 210° C. for 30 minutes, then post-cured at 90° C. under nitrogen for 6 hours, followed by a uniform transition to 305° C. over a 10 hour period, then holding at 305° C. for 26 hours. Initial properties are shown in Table I. Samples of the o-rings were exposed to JP-4 jet fuel for 70 hours at 288° C. under 25% compression. Properties before and after exposure are also shown in Table I.

TABLE I

| | 1A | 1B | 1C | (Control) 1D | (Control) 1E |
|---|---|---|---|---|---|
| Polymer | 100 | 100 | 100 | 100 | 100 |
| SAF Black[1] | | | | 12 | |
| MT Black[2] | 40 | 50 | 60 | | 25 |
| 18-Crown-6 | 0.3 | 0.3 | 0.3 | 0.3 | 0.3 |
| Tetraphenyltin | 3 | 3 | 3 | 3 | 3 |
| Physical Properties Before Exposure | | | | | |
| $M_{100}$, MPa | 15.1 | 16.7 | 16.6 | 6.2 | 7.8 |
| $T_B$, MPa | 20.4 | 19.9 | 16.7 | 15.1 | 19.8 |
| EB, % | 131 | 101 | 99 | 169 | 179 |
| Hardness | 90 | 93 | 94 | 85 | 85 |
| Comp. Set, % (o-rings) | 22 | 25 | 25 | 25 | 25 |
| Physical Properties After Exposure to JP-4 Oil @ 288° C. and 25% Compression | | | | | |
| $M_{100}$, MPa | 4.8 | 6.4 | 7.9 | 2.7 | 2.7 |
| $T_B$, MPa | 9.3 | 9.7 | 11.0 | 12.2 | 8.4 |
| EB, % | 265 | 204 | 204 | 267 | 272 |
| Hardness | 83 | 85 | 86 | 77 | 76 |
| Comp. Set, % (o-rings) | 88 | 88 | 88 | NM[3] | 91 |
| Wt. Change, % | 0.6 | 0.6 | 0.5 | 0.4 | 1.1 |
| Vol. Change, % | 10 | 10 | 8 | 11 | 13 |

[1] Average particle size 14 nm, designated N110, according to ASTM D-1765.
[2] Average particle size 472 nm, designated N990, according to ASTM D-1765.
[3] Fractured. Not measurable due to deterioration caused by exposure to oil and high temperature.

Example 2

One hundred parts of a perfluoroelastomer containing copolymerized units of tetrafluoroethylene, perfluoro(methyl vinyl)ether, and perfluoro-(8-cyano-5-methyl-3,6-dioxa-1-octene) in a mole ratio of approximately 69.3/30/0.7 Was compounded on a rubber mill at 55° C. with 60 parts MT carbon black Of average particle size 472 nm (designated N990, according to ASTM D-1765), 0.3 parts 18-crown-6, and 3 parts tetraphenyltin. The compound was molded, cured, and post-cured as described in Example 1. Following post-cure, the samples were heat aged at 316° C. for 70 hours Physical properties of unaged and aged samples are shown in Table II. A control composition, Comparative Example 2A, which contained only 25 phr MT black was also prepared, compounded, and cured in the same manner. Physical properties of the control are also shown in Table II.

TABLE II

| | Example 2 | Comparative Example 2A |
|---|---|---|
| Properties Prior to Heat Aging | | |
| $M_{100}$, MPa | 10.9 | 9.1 |
| TB, MPa | 16.9 | 18.0 |
| $E_B$, % | 78 | 148 |
| Hardness | 92 | 78 |
| Compression Set, % (pellets) | 14 | 19 |
| Properties After Heat Aging | | |
| $M_{100}$, MPa | 6.5 | 2.8 |
| $T_B$, MPa | 7.1 | 5.6 |

TABLE II-continued

|  | Example 2 | Comparative Example 2A |
| --- | --- | --- |
| $E_B$, % | 158 | 270 |
| Hardness | 92 | 78 |
| Compression Set, % (pellets) | 21 | 20 |
| Weight Change, % | −3.0 | −4.0 |

Example 3

A perfluoroelastomer containing copolymerized units of tetrafluoroethylene, perfluoro(methyl vinyl)ether, and perfluoro-(8-cyano-5-methyl-3,6-dioxa-1-octene) in a mole ratio of approximately 69.3/30/0.7 was compounded with large particle size carbon black and other additives as shown in Table III. The samples were compounded, molded, and cured as described in Example 1. Physical properties of the heat aged samples and of samples which were heat aged and then exposed to JP-4 jet fuel for 70 hours at 288° C. under 25% compression are reported in Table III.

TABLE III

|  | 3A | 3B |
| --- | --- | --- |
| Perfluoroelastomer | 100 | 100 |
| MT Carbon Black | 45 | 45 |
| 18-Crown-6 | 0.3 | 0.3 |
| Tetraphenyltin | 3 | 3 |
| Perfluoropolyether[1] | 10 | 20 |
| *Physical Properties Before Exposure* |  |  |
| $M_{100}$, MPa | 10.5 | 8.0 |
| $T_B$, MPa | 16.4 | 12.8 |
| $E_B$, % | 152 | 158 |
| Hardness | 79 | 77 |
| Compression Set, % (o-rings) | 20 | 15 |
| *Physical Properties After Exposure to IP-4 Oil @ 288° C. and 25% Compression* |  |  |
| $M_{100}$, MPa | 3.3 | 3.2 |
| $T_B$, MPa | 3.4 | 3.1 |
| $E_B$, % | 339 | 247 |
| Hardness | 77 | 75 |
| Compression Set, % (o-rings) | 93 | 91 |

[1]Krytox® fluorinated oil grade 16350 (available from E. I. du Pont de Nemours and Co.).

I claim:

1. A composition comprising
   a) a perfluoroelastomer having copolymerized units of
      i) a perfluoroolefin,
      ii) a perfluoro(alkyl vinyl)ether of the formula $CF_2\!=\!CFO(R_f'O)_n(R_f''O)_m R_f$ where $R_f'$ and $R_f''$ are different linear or branched perfluoroalkylene groups of 2–6 carbon atoms, m and n are independently 0–10, and $R_f$ is a perfluoroalkyl group of 1–6 carbon atoms, and
      iii) a cure site monomer which is either free of hydrogen atoms or which has hydrogen atoms that are removed during crosslinking of the perfluoroelastomer; and
   b) 35–70 parts per hundred parts perfluoroelastomer of a carbon black having an average particle size of at least about 100 nm as determined by ASTM D-3849; with the proviso that the cure site monomer of the perfluoroelastomer of component a) is present in an amount no greater than 3 mol % of the perfluoroelastomer.

2. The composition of claim 1 wherein the perfluoroolefin is tetrafluoroethylene.

3. The composition of claim 1 wherein the perfluoro(alkyl vinyl)ether is perfluoro(methyl vinyl)ether.

4. The composition of claim 1 wherein the amount of carbon black present is 35–60 parts per hundred parts perfluoroelastomer.

5. The composition of claim 1 wherein the amount of carbon black present is 40–60 parts per hundred parts perfluoroelastomer.

6. The composition of claim 1 wherein the carbon black has an average particle size of at least about 150 nm.

7. The composition of claim 1 wherein the carbon black has average particle size of at least about 200 nm.

8. A composition comprising
   a) a perfluoroelastomer having copolymerized units of
      i) a perfluoroolefin;
      ii) a perfluoro(alkyl vinyl)ether of the formula $CF_2\!=\!CFO(R_f'O)_n(R_f''O)_m R_f$ where $R_f'$ and $R_f''$ are different linear or branched perfluoroalkylene groups of 2–6 carbon atoms, m and n are independently 0–10, and $R_f$ is a perfluoroalkyl group of 1–6 carbon atoms; and
      iii) a cure site monomer which is either free of hydrogen atoms or which has hydrogen atoms that are removed during crosslinking of the perfluoroelastomer wherein the cure site monomer has at least one cyano substituent; and
   b) 35–70 parts pert hundred parts perfluoroelastomer of a carbon black having an average particle size of at least about 100 nm as determined by ASTMD-3849;
with the proviso that the cure site monomer of the perfluoroelastomer of component a) is present in an amount no greater than 3 mole of the perfluoroelastomer.

9. The composition of claim 1 wherein the cure site monomer has at least one pentafluorophenyl substituent.

10. The composition of claim 9 wherein the cure site monomer is a compound of the formula

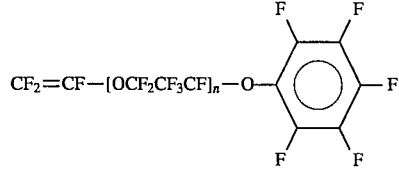

wherein n=1–2.

11. The composition of claim 8 wherein the cure site monomer is a cyano-substituted perfluoro(vinyl ether).

12. The composition of claim 11 wherein the cure site monomer is a compound of formula $CF_2\!=\!CF\!-\![OCF_2\!-\!CF_3CF]_x\!-\!O\!-\!(CF_2)_n\!-\!CN$ wherein x=1–2, and n=1–4.

* * * * *